Sept. 21, 1937.                 H. A. KNOX                 2,093,456
                         SUSPENSION FOR VEHICLES
                           Filed July 29, 1936                3 Sheets-Sheet 1
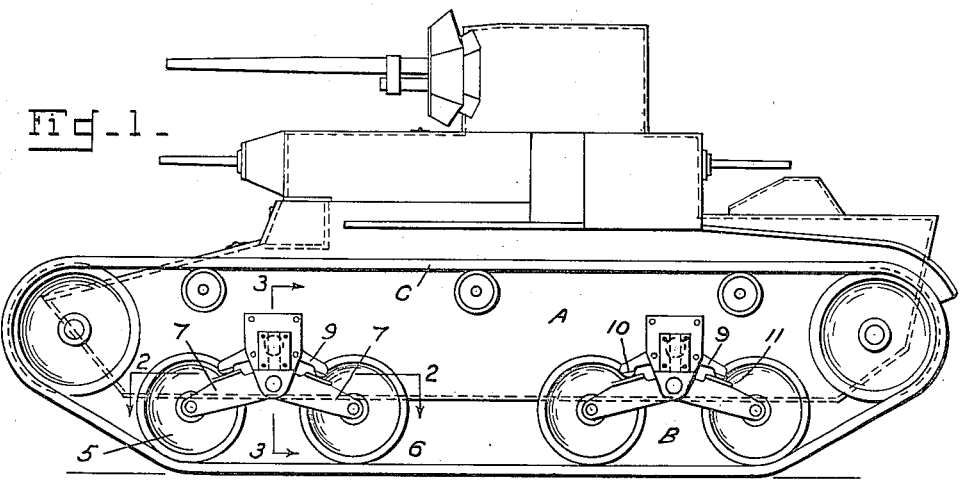
Fig-1-
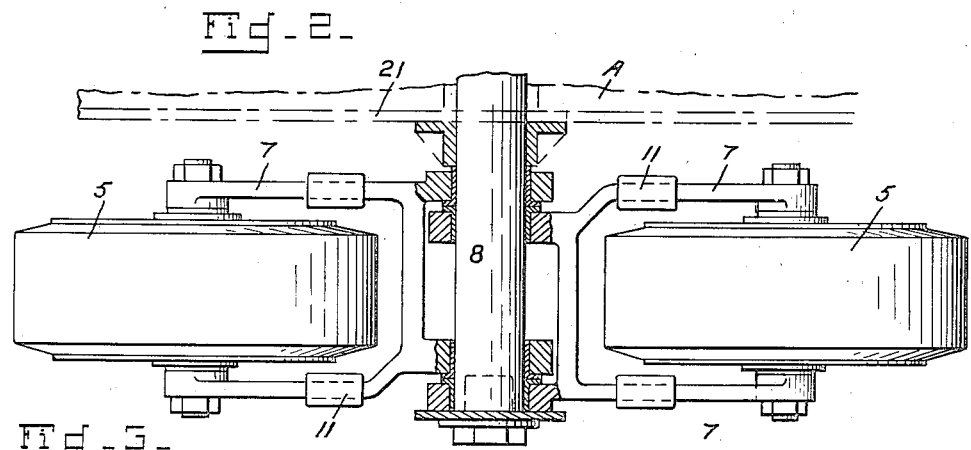
Fig-2-
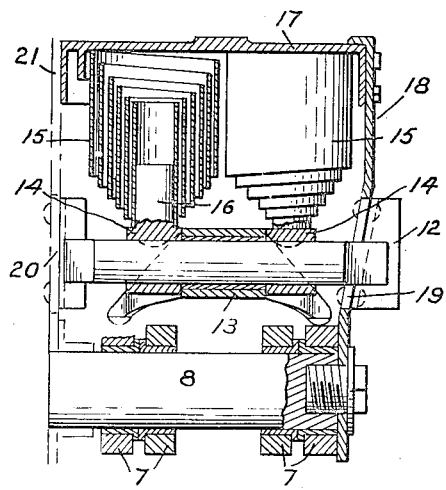
Fig-3-
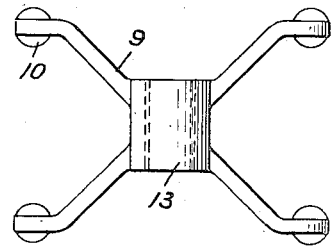
Fig-4-
Inventor
Harry A. Knox
By W. N. Roach
   Attorney Sept. 21, 1937.     H. A. KNOX     2,093,456
SUSPENSION FOR VEHICLES
Filed July 29, 1936     3 Sheets-Sheet 2
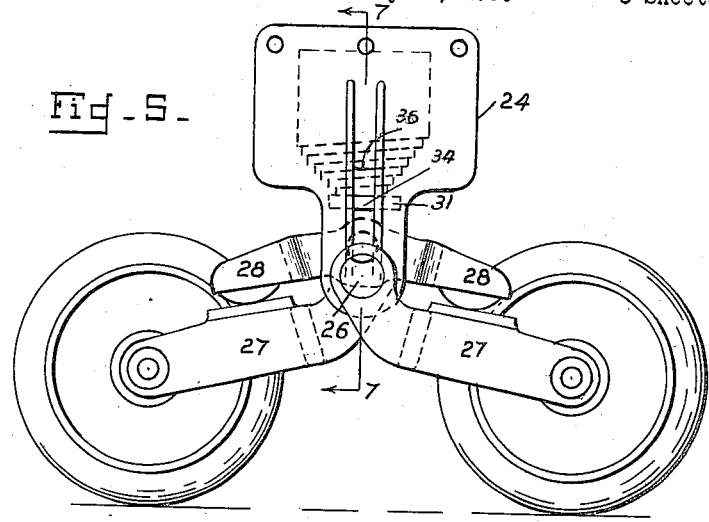
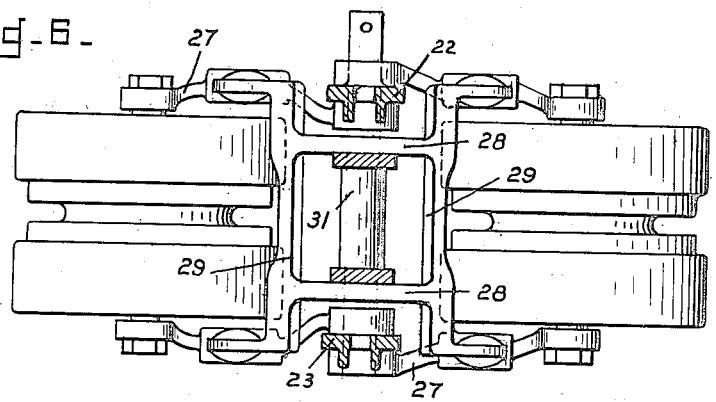
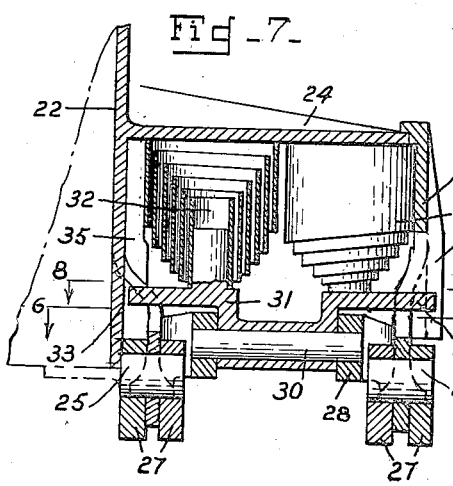
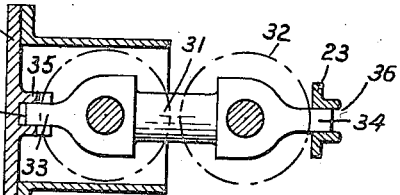
Inventor
Harry A. Knox
By W. N. Roach
Attorney Sept. 21, 1937. H. A. KNOX 2,093,456
SUSPENSION FOR VEHICLES
Filed July 29, 1936  3 Sheets-Sheet 3
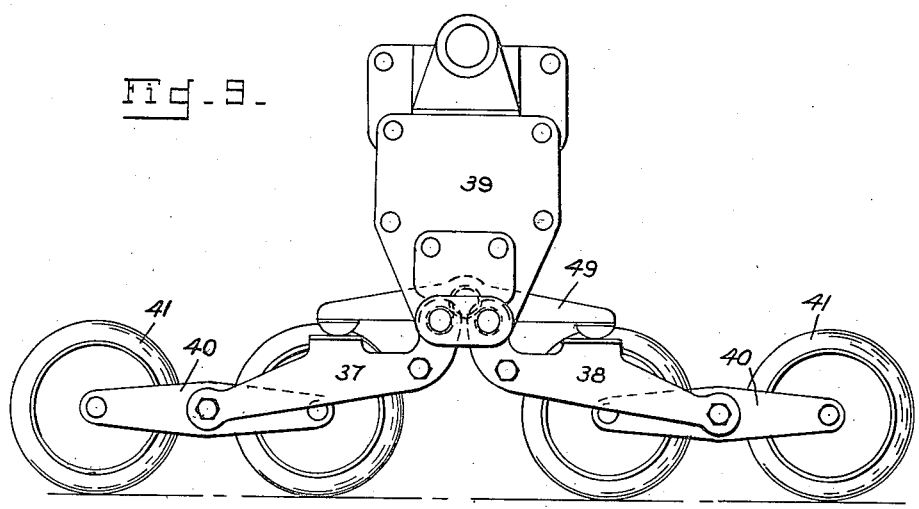
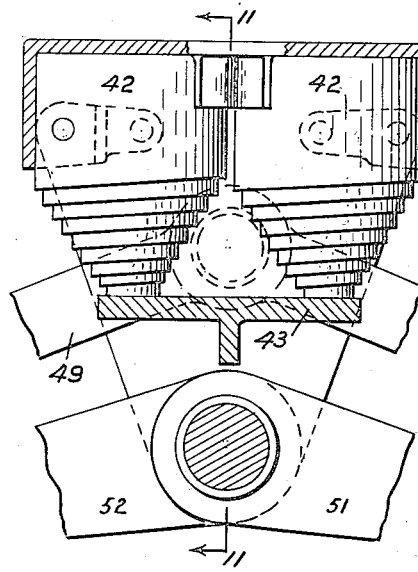 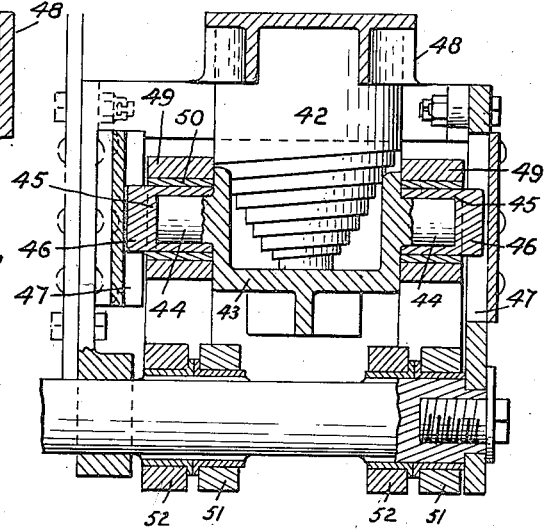
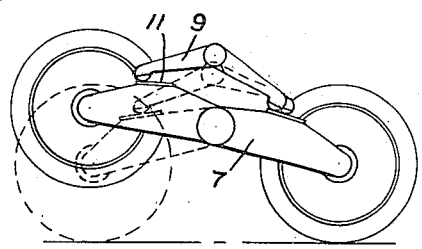
Inventor
Harry A. Knox
By W. N. Roach
Attorney Patented Sept. 21, 1937

2,093,456

UNITED STATES PATENT OFFICE 2,093,456

SUSPENSION FOR VEHICLES

Harry A. Knox, Washington, D. C.

Application July 29, 1936, Serial No. 93,234

2 Claims. (Cl. 267—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a suspension for vehicles and is an improvement on the suspension of Patent No. 1,947,475 of February 20, 1934.

In the patent a pair of independently mounted arms carrying supporting members are associated through a linkage whereby a spring yieldingly connects the arms to a vehicle body. In that arrangement certain elements of the linkage were subject to a severe twisting action which produced excessive wear and consequent looseness.

The purpose of this invention is to provide an arrangement in which the parallel end links of the patent are eliminated and replaced by sliding surfaces.

A further object is to provide a suspension of this character in which several springs may be employed and a compact assembly obtained by lowering the seat for the springs.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a view in side elevation of a tracklaying vehicle equipped with the improved suspension units.

Figs. 2 and 3 are sectional views on the corresponding lines of Fig. 1.

Fig. 4 is a plan view of the load transmitting lever.

Fig. 5 is a view in side elevation of a modified form of the suspension unit.

Figs. 6 and 7 are sectional views on the corresponding lines of Fig. 5.

Fig. 8 is a sectional view on the line 8—8 of Fig. 7.

Fig. 9 is a view in side elevation of another modification.

Fig. 10 is a sectional view showing a pair of springs arranged longitudinally of the vehicle.

Fig. 11 is a sectional view on the line 11—11 of Fig. 10.

Fig. 12 is a schematic view showing one of the units in action.

Referring to Figs. 1 to 4 there is shown a vehicle body A supported on each side by units B—B about the supporting member of which is trained an endless ground-engaging track C. Each unit consists of a pair of successively arranged supporting members 5—5, each member having its axis 6 mounted in the extremities of a set of spaced arms 7—7. The sets of arms for the members are journaled independently of each other on a support shaft 8 carried by and projecting laterally from the body A. The oppositely extending arms 7 are associated through a lever 9 which includes arms overlying the arms 7 and having rounded ends 10 which slidably rest on seats 11 provided on the upper sides of the arms 7 intermediate their ends.

A pin 12 passing through the central portion 13 of the lever 9 carries a pair of spring seats 14—14 which are keyed in place on opposite sides of the central portion of the lever. A pair of volute springs 15—15, each mounted on one of the seats 14 and held against lateral displacement by a pilot column 16 have their upper ends engaging a bracket 17 fixed to the body whereby they provide a yielding suspension between the body and the unit. The outer end of the bracket is supported by a plate 18 mounted on the shaft 8. The pin 12 extends beyond the spring seats and its ends are disposed in vertical guideways 19 and 20 provided respectively in the plate 18 and in the side plate 21 of the vehicle body.

In this form of construction the shaft 8 which is the pivot of the arms 7—7 is positioned some distance below the pin 12 which is the pivot of the levers 9—9.

In the modification shown in Figs. 5-8 the inner plate 22 and the outer plate 23 of the bracket 24 respectively carry short support shafts 25 and 26 for mounting the corresponding inner and outer arms 27. The inner and outer arms of the lever 28 are connected adjacent their central portions by webs 29. A pin 30 passing through the central portions of the levers rotatably mount the spring seat 31 which is of sufficient size to accommodate a plurality of volute springs 32—32. The spring seat is formed with laterally projecting fingers 33—34 which respectively move in slots 35—36 in the plates 22 and 23 and serve as a guide.

In this arrangement the pivot 30 of the lever 28 and the spring seat 31 are disposed between the arms 27 and are thereby appreciably lowered.

In the modification shown in Fig. 9 the arms 37 and 38 are mounted in the bracket 39 with their pivots adjacent each other. Each set of arms carries a pivotally mounted supporting member comprising a frame 40 in which a pair of ground engaging elements 41 are mounted.

In Figs. 10 and 11 a pair of volute springs 42—42 are arranged longitudinally of the vehicle and are carried on a spring seat 43 which is formed with opposite trunnions 44—44 positioned above the seating surface of the springs. Each trunnion carries a press-fitted sleeve 45 whose outer end is formed into a guide 46 working in a guideway 47 in a side plate of the bracket 48. A lever 49 is rotatably mounted on each sleeve 45 through a bushing 50 and its ends are adapted to slidably engage oppositely extending arms 51—52 similar to the arms 7 of Fig. 2 and in the manner heretofore described.

The operation of the suspension is shown in Fig. 12 in which one supporting member is raised and the corresponding arm of the lever 9 has moved along the seat 11 away from the pivot of the arm 7. This action increases the effective length of the lever and serves to give the effect of a stiffer spring.

I claim.

1. In a suspension for vehicles, a member to be supported, a bracket on said member including spaced vertical guideways, oppositely extending arms pivotally mounted on the bracket for independent movement, a supporting member on each arm, a lever having its ends slidably resting on intermediate portions of the arms, a spring seat carried by the lever, guides on the spring seat and lever assembly and engaging the guideways, and a yielding connection between the spring seat and the bracket.

2. In a suspension for vehicles, a member to be supported, oppositely extending arms pivotally mounted on said member for independent movement, a supporting member on each arm, a lever having its ends slidably resting on intermediate portions of the arms, the central part of said lever disposed between the arms, a seat pivotally mounted on the central part of the lever and a yielding connection between the seat and the member to be supported.

HARRY A. KNOX.